United States Patent [19]

Ong et al.

[11] Patent Number: 4,645,727
[45] Date of Patent: Feb. 24, 1987

[54] COLORED TONER COMPOSITIONS COMPRISING DYE CHROMOPHORES

[75] Inventors: Beng S. Ong, Mississauga; Walter Mychajlowskij, Georgetown, both of Canada

[73] Assignee: Xerox Corporation, Stamford, Conn.

[21] Appl. No.: 853,270

[22] Filed: Apr. 17, 1986

[51] Int. Cl.$^4$ .......................... G03G 9/00; G03G 9/08
[52] U.S. Cl. ..................................... 430/106; 528/125; 430/109
[58] Field of Search ......................... 528/125; 430/106

[56] References Cited

U.S. PATENT DOCUMENTS

| | | | |
|---|---|---|---|
| 3,232,691 | 2/1966 | Wilhelm et al. | 8/1 |
| 3,549,304 | 12/1970 | Ebel et al. | 8/12 |
| 3,699,135 | 10/1972 | Baptista et al. | 260/37 |
| 4,101,269 | 7/1978 | Champenois | 8/4 |
| 4,375,357 | 3/1983 | Wingard et al. | 525/333.6 |

*Primary Examiner*—John D. Welsh
*Attorney, Agent, or Firm*—E. O. Palazzo

[57] ABSTRACT

Disclosed is a toner composition comprised of resin particles and covalently bonded polymeric dye chromophores of the following formula:

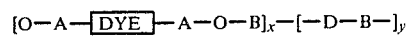

wherein A is selected from the group consisting of alkylene and arylene; B is selected from the group consisting of

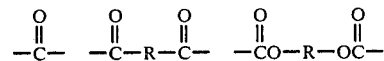

wherein R is an alkylene group, an arylene or polyether segment; D is selected from the group consisting of dioxyalkane or dioxyarene; x is a fraction number from 0.01 to about 0.50; and y is a fraction number of 0.50 to about 0.99, the sum of x and y being equal to 1.

62 Claims, No Drawings

COLORED TONER COMPOSITIONS COMPRISING DYE CHROMOPHORES

BACKGROUND OF THE INVENTION

This invention is generally directed to toner compositions, and the use of these compositions in electrostatographic imaging systems. More specifically, the present invention is directed to colored toner resins which can be selected for the formulation of colored toner and developer compositions where leaching or bleeding of the colorants is substantially eliminated. Without leaching there are enabled toner compositions that retain their color fidelity or intensity over extended time periods. Also, the dyed toner and developer compositions of the present invention are useful in various electrostatographic imaging systems, particularly colored imaging systems, having incorporated therein as the photoresponsive member a layered imaging device which is negatively charged.

Toner and developer compositions including colored developer compositions are well known. These compositions usually contain toner particles consisting of a resin and colorants, and carrier particles. With regard to colored developer compositions, the colorants are usually selected from cyan dyes or pigments, magenta dyes or pigments, yellow dyes or pigments, and mixtures thereof. There is thus disclosed in U.S. Pat. No. 3,844,815 colored developer compositions containing as the yellow pigment Foron Yellow, while U.S. Pat. No. 4,035,310 discloses colored toner compositions comprised of pigment Yellow 97; and carrier particles generally comprised of steel coated with various polymeric resinous substances.

Also, it is known that the prime advantage of selecting organic dyes instead of pigments for color toner compositions resides in the provisions of increased color fidelity as the dyes can be molecularly dispersed in the toner resins. To obtain a homogeneous dispersion, however, it is generally necessary to build into these molecules certain substituents for enhancing their compatibility with the toner resin. Unless the dye molecules are fully compatible with the toner resins, they have a tendency to aggregate with time, especially when subjected to heat, pressure and humidity thereby resulting in a loss of color fidelity. Additionally, the low molecular weights of the dye molecules causes a high lability, or mobility of the dye molecules in the toner resin resulting in undesirable bleeding of the dyes.

Several prior art patents also disclose the incorporation into toner compositions as separate components, charge enhancing additives primarily for the purpose of imparting a positive charge to the toner resin particles. There is thus disclosed in U.S. Pat. No. 4,298,672 positively charged toner compositions containing resin particles and pigment particles, and as a charge enhancing additive alkyl pyridinium compounds and their hydrates of the formula as detailed in column 3, beginning at line 14. Examples of alkyl pyridinium compounds disclosed include cetyl pyridinium chloride. Moreover, there is disclosed in U.S. Pat. No. 4,338,390 positively charged toner compositions having incorporated therein as charge enhancing additives various organic sulfate and sulfonate compositions, including stearyl dimethyl phenethylammonium paratoluene sulfonate. Further, in U.S. Pat. No. 3,893,935 there is described the use of quaternary ammonium salts as charge control agents for electrostatic toner compositions.

Additionally, there are disclosed in the prior art colored toner and developer compositions containing as charge enhancing additives para-halophenylcarboxylic acids and the salts thereof. More specifically, there are disclosed in this patent positively charged toner compositions containing resin particles; dye particles such as cyan, magenta, or yellow dyes; and as a charge enhancing additive in an amount of from about 0.1 percent by weight to about 10 percent by weight parahalophenylcarboxylic acids, and the salts thereof, including 4-fluorobenzoic acid, 4-chlorobenzoic acid, and 4-bromobenzoic acid.

Other prior art includes U.S. Pat. No. 3,699,135 which discloses polymeric dyes prepared by the copolymerization of a specific silane with a derivative of an anthraquinone containing two aliphatic hydroxy groups; and U.S. Pat. Nos. 3,232,691; 3,549,304; and 4,101,269. These references appear to disclose that the functional group formed on the chromophore enters into the polymerization reaction with the monomer leaving the chromophore as a pendant moiety in the polymer structure. Of background interest pertaining to the chemical incorporation of chromophores into polymers there were selected as prior art U.S. Pat. Nos. 3,027,362; 3,117,957; 3,337,288; 3,344,098; 3,462,388; 3,467,642; 3,639,243; 3,852,208; 4,051,183; 4,194,877; 4,217,406; 4,339,237; and 4,397,651.

Although the above described toner and developer compositions are suitable for their intended purposes, there continues to be a need for new compositions. Specifically, there continues to be a need for colored toner compositions wherein dye aggregation and dye bleeding are eliminated. Also, there is a need for colored toner compositions which retain their color fidelity for extended time periods. There is also a specific need for colored toner compositions wherein the colorants exhibit no tendency to leach, bleed, or sublime. Further, there remains a need for colored toner compositions whose colorants are uniformly dispersed thus imparting greater clarity and brightness to the resultant electrographic prints. Moreover, there is a need for toner compositions wherein the toner resin particles are intrinsically colored. Further, there is a need for colored toner compositions wherein the dye chromophores are covalently linked to the backbone of the polymer resin thereby avoiding the prior art problems of dye bleeding and aggregation normally associated with the dye-in-polymer compositions. Additionally, there is a need for processes that enable the simple preparation of intrinsically colored toner compositions.

SUMMARY OF THE INVENTION

It is therefore an object of the present invention to provide colored toner and developer resins which can be selected for colored toner and developer compositions which overcome many of the above-noted disadvantages.

It is a further object of the present invention to provide colored toner and developer resins which contain covalently bonded color chromophores.

In another object of the present invention there are provided colored toner and developer resins which resist dye bleeding and aggregation, and which retain their color fidelity over extended time periods.

A further object of the present invention is to provide a chemical process for the synthesis of the aforementioned colored toner and developer resins.

In still a further object of the present invention there are provided intrinsically dyed resins which can be utilized in the generation of colored toner and developer compositions, which compositions are useful in color imaging systems wherein electrostatic images are separately formed on various imaging members, followed by sequential development with developer compositions containing the colored resins of the present invention, followed by the transfer of the developed images to suitable substrates, and optionally permanently affixing thereon.

These and other objects of the present invention are accomplished by providing toner and developer resins containing covalently bonded dye chromophores of the following formula

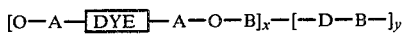

wherein A is selected from the group consisting of alkylene and arylene; B is selected from the group consisting of

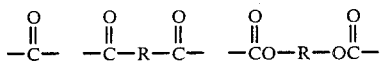

wherein R is an alkylene group, an arylene or polyether segment; D is selected from the group consisting of dioxyalkane or dioxyarene; x is a fraction number of from 0.01 to 0.50; and y is a fraction number of from 0.50 to 0.99, the sum of x+y being equal to 1.

As alkylene substituents there are mentioned alkylene groups of from about 1 to about 6 carbon atoms inclusive of methylene, ethylene, propylene, and butylene, while arylene substituents include those of from about 6 carbon atoms to about 24 carbon atoms, such as phenylene and the various derivatives thereof.

Other alkylene groups are tetramethylene, pentamethylene, hexamethylene, and the like. Further, arylene groups include tolylene, benzylene, biphenylene, and the like. Alkarylene groups include xylenylene, phenylenediethylene, phenylene-1,3-propylene, 4,4'-biphenylenedimethylene, and the like. Polyether segments include diethylene ether, dipropylene ether, triethylene ether, tetraethylene ether, and the like.

More specifically, with reference to the chromophores of the present invention specific illustrative examples of A substituents include

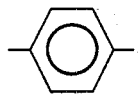

(i) para-phenylene

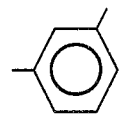

(ii) meta-phenylene

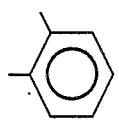

(iii) ortho-phenylene

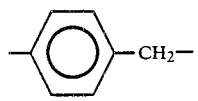

(iv) para-benzylene

(v) 1,8-octamethylene   (vi) 3-methyl-1,4-butylene

With regard to compositions represented by the above formula, illustrative examples of D substituents include:

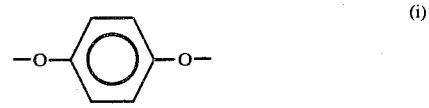

(i)

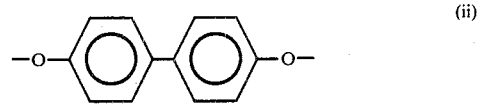

(ii)

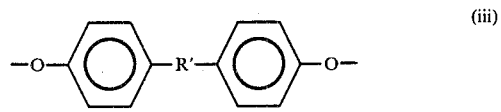

(iii)

wherein R' is an oxygen atom, sulfur atom, sulfoxide group, sulfone group, dialkylsilyl group, an alkylene, arylene, or alkarylene. Alkylene, arylene and alkarylene groups include methylene, ethylene, propylene, dimethylmethylene, phenylene, tolylene, benzylene, p-phenylenedimethylene, diphenylmethylene, and the like.

Examples of the dye chromophores, DYE, are illustrated by the following general formula:

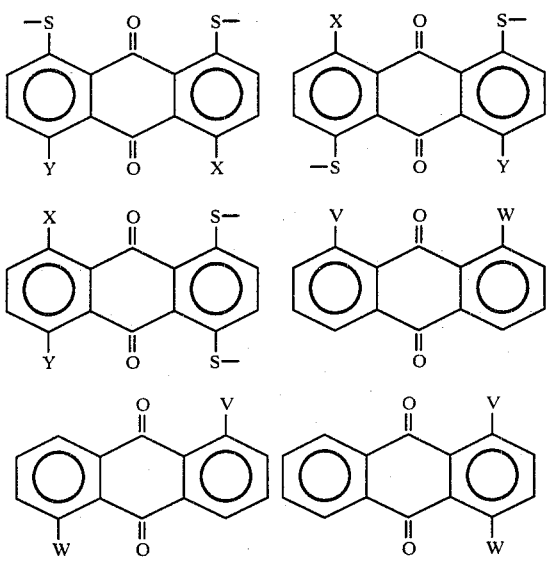

wherein X and Y are independently selected from the following groups:

$SC_6H_5$; $SCH_3$; $SC_2H_5$; and H

V and W are independently selected from the following groups:

$NH(CH_2)_n-$; $NHC_6H_4-$; $NH(CH_2)_nC_6H_4-$; and $NHC_6H_4(CH_2)_n-$ and n is a number of from zero (0) to about 20.
Specific illustrative examples of colored polymer compositions encompassed by the above formulas, and wherein the substituents are as defined herein include:
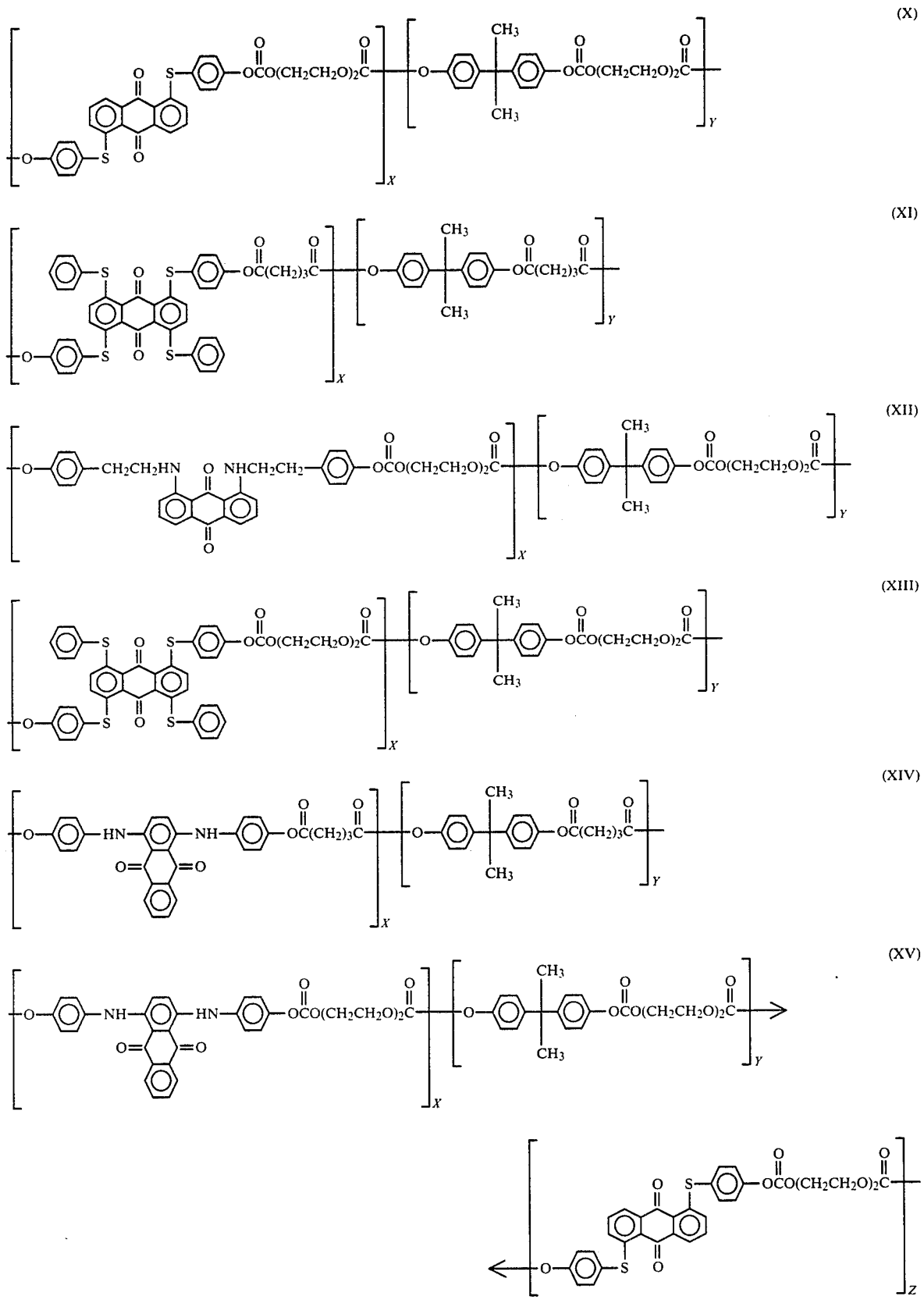

with Y being a number of from 0.50 to 0.99, and X+Z being a number that equals 0.01 to 0.50.
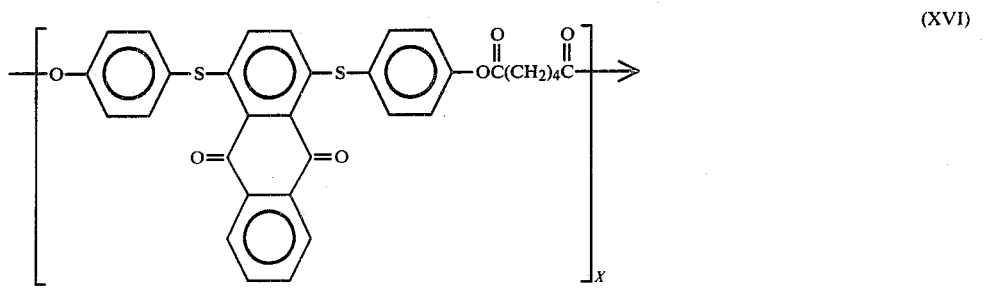
(XVI)
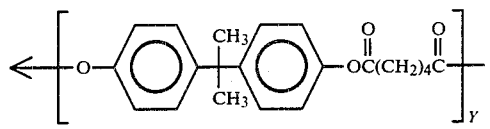
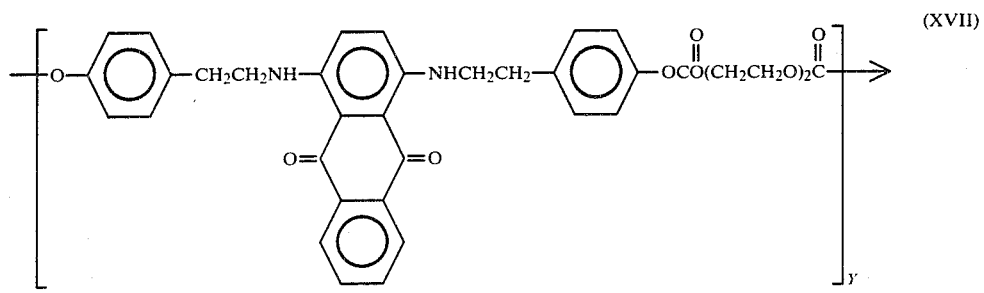
(XVII)
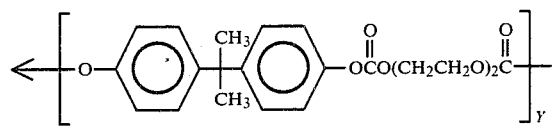
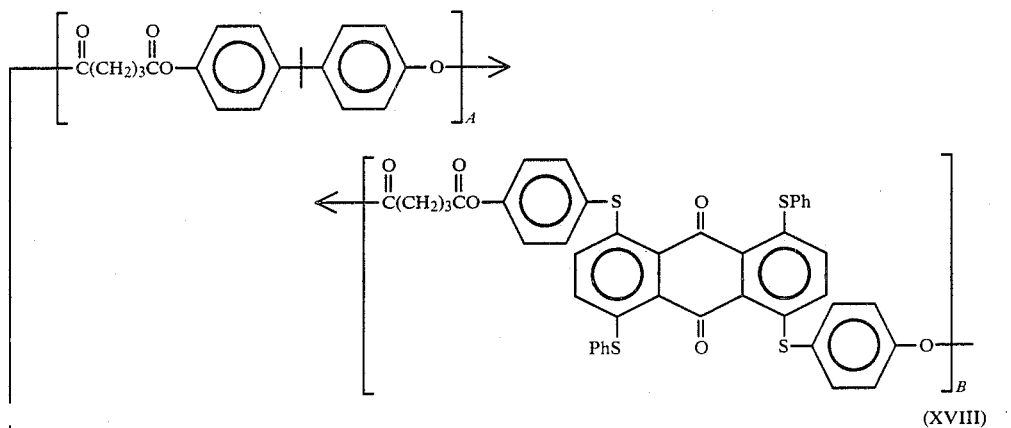
(XVIII)
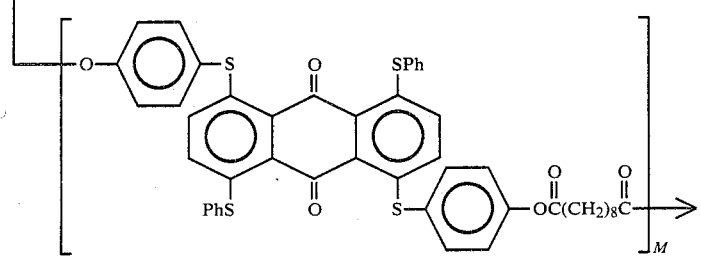

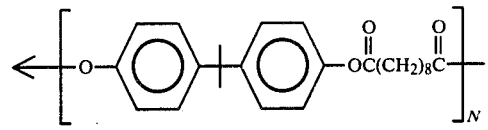

wherein B+M is equal to 0.07; and A+N is equal to 0.93.

The toner resin compositions with the dye chromophore of the present invention can be synthesized by a number of suitable processes. In one process embodiment certain yellow, red and blue anthraquinone dyes are functionalized to the respective bisphenolic dyes, followed by the polycondensation of these dyes and certain bisphenols with diacyl halides or bishaloformates. More specifically, the reaction scheme for the preparation of a dyed polycarbonate or polyester resin is illustrated with reference to the following reaction scheme:

SCHEME

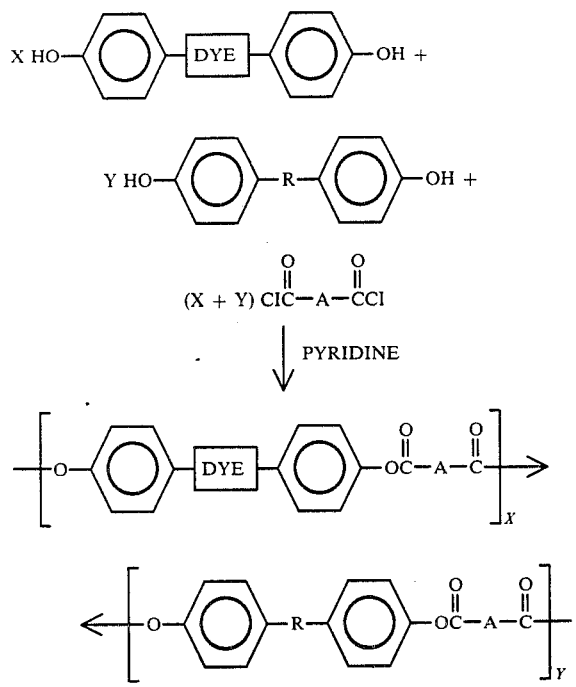

wherein A is R' is —OR'O—, with R' being alkylene, arylene and their derivatives.

Examples of specific functionalized bisphenolic dyes selected for the reaction include:

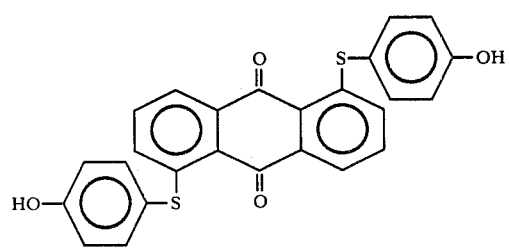

1,5-Bis(p-hydroxyphenylthio)anthraquinone(YELLOW)

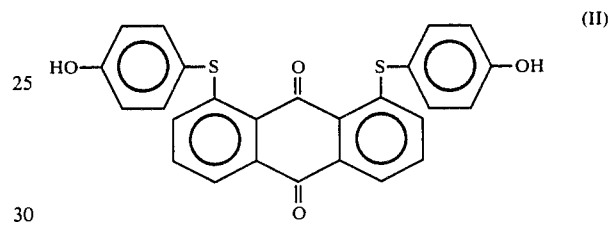

1,8-Bis(p-hydroxyphenylthio)anthraquinone(YELLOW)

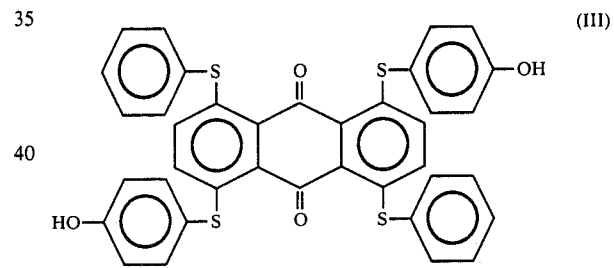

1,5-Bis(p-hydroxyphenylthio)-4,8-bis(phenylthio)anthraquinone(RED)

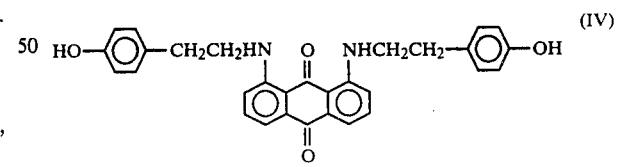

1,8-Bis[2-(p-hydroxyphenyl)ethylamino]anthraquinone(RED)

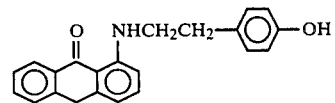

1,5-Bis[2-(p-hydroxyphenyl)ethylamino]anthraquinone(RED)

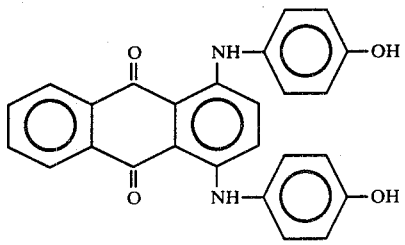

1,4-Bis(p-hydroxyphenylamino)anthraquinone(BLUE)

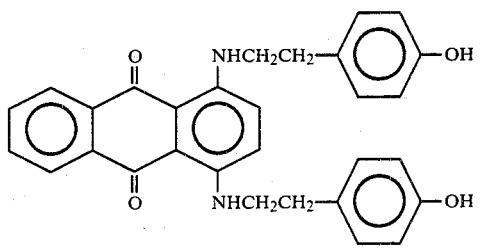

1,4-Bis[2-(p-hydroxyphenyl)ethylamino]anthraquinone(BLUE)

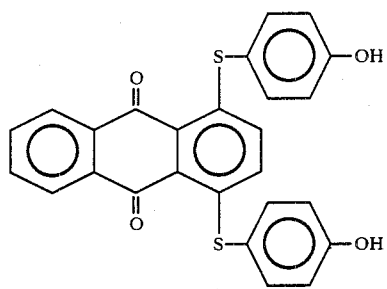

1,4-(p-hydroxyphenylthio)anthraquinone(RED)

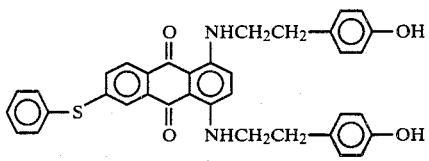

6-phenylthio-1,4-bis[2-(p-hydroxyphenyl)ethylamino]anthraquinone(GREEN)

Examples of bisphenols that may be selected as comonomers in the polycondensation are 1,4-dihydroxybenzene, 4,4'-dihydroxybiphenyl, bis(p-hydroxyphenyl)ether; bis(p-hydroxyphenyl)sulfide; bis(p-hydroxyphenyl)sulfoxide; bis(p-hydroxyphenyl)sulfone; dimethyl-bis(p-hydroxyphenyl)silane; bis(o-hydroxyphenyl)methane; bis(m-hydroxyphenyl)methane; bis(p-hydroxyphenyl)methane; 1,2-bis(p-hydroxyphenyl)ethylene; 2,2-bis(p-hydroxyphenyl)propane; 1,1-bis(-hydroxyphenyl)ethane; 1,1-bis(p-hydroxyphenyl)butane; 2,2-bis(p-hydroxyphenyl)butane; 2,2-bis(p-hydroxyphenyl)hexane; 1,1-bis(p-hydroxyphenyl)cyclopentane; and similar equivalents thereof.

Examples of diacyl halides employed in the polyesterification reaction include succinyl chloride, glutaryl chloride, adipoyl chloride, dimethylglutaryl chloride, suberyl chloride, phthaloyl chloride, isophthaloyl chloride, terephthaloyl chloride, and the like. Examples of bishaloformates used in the reactions include ethyleneglycol bischloroformate, diethyleneglycol bischloroformate, triethyleneglycol bischloroformate, tetraethyleneglycol chloroformate, biphenoxy chloroformate, propylene-glycol chloroformate, dipropyleneglycol chloroformate, butyleneglycol chloroformate, ethyleneglycol bromoformate, propyleneglycol bromoformate, and the like.

More specifically, with regard to the process of preparation the funtionalized dye and a bisphenol are dissolved in a suitable organic solvent such as methylene chloride in the presence of an organic base such as pyridine at room temperature, with the molar ratio of the dye to bisphenol being from 0.01 to 0.50, and preferably from 0.04 to 0.30. However, the actual molar ratio employed depends largely on the molar absorptivity of the functionalized dye to enable the resultant colored polymer to possess the required optical density for imaging purpose. Therefore, for each mole of the bisphenoxy compound, 2 to 5 moles of pyridine are used. Further, the concentration of the bisphenoxy compounds is approximately 5–15% (W/V). Subsequently, the solution is mechanically stirred and cooled by means of an ice bath to slightly below 10° C., and 1.0 mole of freshly distilled diacyl halide (for polyester resins) or bishaloformate (for polycarbonate resins) is then added dropwise over a period of 5–30 minutes. The reaction temperature is maintained at below 15° C. during addition. After addition, the ice bath is removed, and the reaction mixture is further stirred at room temperature for another 1–5 hours to complete the polymerization. The reaction mixture is then diluted with 2 folds of solvent, and the resulting solution is washed several times with water to remove pyridinium halide and excess pyridine. Subsequently, the organic phase is separated, dried with magnesium sulfate, filtered and concentrated to about half of its original volume. The colored polymer product is precipitated by pouring the above organic solution into a swirling methanol or hexane. The precipitated polymer is filtered, washed thoroughly with methanol or hexane, and dried in vacuo.

With further reference to the compositions of the present invention, other resin chromophore structures not specifically disclosed may be useful providing the objectives thereto are achievable. Furhermore, although the colored chromophore resins of the present invention are primarily useful for toner and developer formulations, they can also be selected as polymeric colorants in conjunction with suitable host resins enabling colored toner and developer preparation providing that a sufficient amount of the colored chromophores, that is 10 percent by weight to about 50 percent by weight, are present to impart the desired optical density for imaging purposes.

Illustrative polymeric host resins selected for admixing with the covalently bonded resin chromophores illustrated hereinabove enabling colored toner compositions include, for example, polycarbonates, polyesters, epoxies, phenolics, copolyesters, polystyrenes, diolefins, and the like. Typical toner resins selected include, for example, polyamides, polycarbonates, diolefins, epoxies, polyurethanes, vinyl resins and polyesters. Any suitable vinyl resin may be selected including homopolymers or copolymers of two or more vinyl monomers.

Typical vinyl monomeric units are styrene, p-chlorostyrene vinyl naphthalene; unsaturated mono-olefins such as ethylene, propylene, butylene, isobutylene and the like; diolefins such as 1,3-butadiene, isoprene and the like; vinyl halides such as vinyl chloride, vinyl bromide, vinyl fluoride; vinyl esters inclusive of vinyl acetate, vinyl propionate, vinyl benzoate, vinyl butyrate and the like; esters of unsaturated monocarboxylic acids including methyl acrylate, ethyl acrylate, n-butylacrylate, isobutyl acrylate, dodecyl acrylate, n-octyl acrylate, 2-chloroethyl acrylate, phenyl acrylate, methylalphachloroacrylate, methyl methacrylate, ethyl methacrylate, butyl methacrylate, and the like; acrylonitrile, methacrylonitrile, acrylamide, vinyl ethers, such as vinyl methyl ether, vinyl isobutyl ether, vinyl ethyl ether, and the like; vinyl ketones like vinyl methyl ketone, vinyl hexyl ketone, methyl isopropenyl ketone and the like; vinylidene halides including vinylidene chloride, vinylidene chlorofluoride and the like; N-vinyl indole, N-vinyl pyrrolidone and the like; styrene butadiene copolymers, and mixtures thereof.

As one preferred toner resin there can be selected the esterification products of a dicarboxylic acid and a diol comprising a diphenol. There materials are illustrated in U.S. Pat. No. 3,655,374, the disclosure of which is totally incorporated herein by reference, the diphenol reactant being of the formula as shown in column 4, beginning at line 5, of this patent, and the dicarboxylic acid being of the formula as shown in column 6. Other preferred toner resins include styrene/methacrylate copolymers, and styrene/butadiene copolymers, available from Goodyear Chemicals as Pliolites; polyester resins obtained from the reaction of bisphenol A and propylene oxide; followed by the reaction of the resulting product with fumaric acid, and branched polyester resins resulting from the reaction of dimethylterephthalate, 1,3-butenediol, 1,2-propanediol, and pentaerythritol.

The toner host resins identified herein are present, for example, in the toner composition in an amount of from about 0 (zero) percent by weight to about 90 percent by weight, and prefereably in an amount of from about 50 percent by weight to about 90 percent by weight; while the colored resin polymer is present in the host toner resin composition in an amount of from about 10 percent by weight to about 50 percent by weight.

Illustrative examples of carrier particles that can be selected for mixing with the dyed colored toner composition of the present invention include those substances that are capable of triboelectrically obtaining a charge of opposite polarity to that of the toner particles. Accordingly, the carrier particles of the present invention can be selected so as to be of a positive polarity causing the toner particles, which are negatively charged to adhere to and surround the carrier particles. Illustrative examples of carrier materials include granular zircon, granular silicon, polymethylmethacrylate, glass, steel, nickel, iron ferrites, silicon dioxide, and the like. Additionally, there can be selected as carrier particles nickel berry carriers as disclosed in U.S. Pat. No. 3,847,604.

The selected carrier particles can be used with or without a coating, the coating generally comprising polyvinylidene resins, terpolymers of styrene, methylmethacrylate, and a silane, such as triethoxy silane, reference U.S. Pat. Nos. 3,467,634 and 3,526,533, the disclosures of which are totally incorporated herein by reference; tetrafluoroethylenes, other fluorocarbon polymers, and the like.

The diameter of the carrier particles can vary, however, generally these materials are from about 50 microns to about 1,000 microns in diameter enabling the carrier particles to possess sufficient density and inertia to avoid adherence to the electrostatic images during the development process. The carrier particles can be mixed with the toner particles in various suitable combinations, however, from about 1 part per toner to about 10 parts to about 200 parts by weight of carrier are mixed.

Also, the toner and developer compositions of the present invention can be prepared by a number of known methods, including melt blending the dyed toner resin particles of the present invention followed by attrition. Other methods inlcude those well known in the art such as spray drying, melt dispersion, extrusion, dispersion polymerization, and suspension polymerization.

Additionally, the toner and developer compositions of the present invention may be selected for use in developing images in electrostatographic imaging systems, particularly colored images, on various suitable imaging surfaces capable of retaining charge such as those surfaces where a negative charge resides on the photoreceptor. The imaging method comprises contacting the electrostatic latent image with the developer compositions of the present invention followed by transferring the resulting image to a suitable substrate, and optionally permanently affixing the image by heat, or by exposure to solvent vapor. Examples of layered organic photoreceptors that can be selected as the imaging members include those comprised of transport layers and photogenerating layers, reference U.S. Pat. No. 4,265,990, the disclosure of which is totally incorporated herein by reference, and other similar layered photoresponsive devices. Useful photogenerating layers include those comprised of trigonal selenium, metal phthalocyanines, metal free phthalocyanines, vanadyl phthalocyanines, squaraine pigments, and azo pigments, while examples of charge transport layers encompass the diamines as disclosed in U.S. Pat. No. 4,265,990, hydrazones, and the like. A preferred photoresponsive device useful in the present invention contains a supporting substrate such as aluminum; a photogenerating layer of trigonal selenium, about 75 to 80 percent by volume, dispersed in about 20 to 25 percent by volume of a polyvinylcarbazole resinous binder; and an amine transport layer with about 50 percent by weight of the amine molecule N,N-diphenyl-N,N bis(3-methylphenyl) 1,1-biphenyl-4,4-diamine, dispersed in a polycarbonate resinous binder, 50 percent by weight. This photoconductive device is negatively charged rendering the positively charged toner compositions of the present invention highly useful for development of latent electrostatic images contained on the surface thereof. Inorganic photoconductive imaging members can also be selected such as amorphous selenium, selenium alloys inclusive of selenium/arsenic, selenium/tellurium, selenium/arsenic/tellurium, and the like.

The following examples are being submitted to further define embodiments of the present invention, it being noted that these examples are intended to illustrate and not to limit the scope of the present invention. Parts and percentages are by weight unless otherwise indicated.

EXAMPLE I

1,5-Bis(p-hydroxyphenylthio)anthraquinone (I)

A mixture of 27.7 grams of (0.1 mole) of 1,5-dichloroanthraquinone, 28.5 grams (0.22 mole) of p-hydroxythiophenol, 30 grams (0.22 mole) of potassium carbonate and 200 milliliters of dimethyl formamide was heated with stirring at 145° C. for 4 hours. The mixture was then cooled to room temperature and poured into 1.5 liters of water. Thereafter, the above product was isolated by filtration and washed with 500 milliliters of water and air dried. The product was then recrystallized from acetic acid to yield 30 grams of 1,5-bis(p-hydroxyphenylthio)anthraquinone as a yellow powder, m.p., 298°–300° C.; ms 456 (M+); vis (DMF), $\lambda_{max}$ 450 nm ($\epsilon$6300); Anal. Calcd. for $C_{26}H_{16}O_4S_2$: C, 68.4; H, 3.53; O, 14.02; S, 14.05. Found: C, 67.93; H, 3.60; O, 14.05; S, 14.26.

EXAMPLE II

1,5-Bis(p-hydroxyphenylthio)-4,8-Bis(phenylthio)anthraquinone (III)

A mixture of 22 grams (0.2 mole) of benzenethiol, 25.6 grams (0.2 mole) of potassium carbonate in 100 milliliters of dimethyl formamide was heated with stirring to 120° C. for 2 hours. The cooled mixture was added to a cold mixture of 36.6 grams (0.1 mole) of 1,5-dichloro-4,8-dinitroanthraquinone in 150 milliliters of dimethyl formamide, and stirred for 3 hours at room temperature. After addition of 25.6 grams (0.2 mole) of p-hydroxybenzenethiol in 100 milliliters of dimethyl formamide, the mixture was stirred at 125° C. for 2 hours. The resulting reaction mixture was then cooled and poured slowly into 2 liters of water. The above solid product III was filtered, washed once each with water, acetic acid, methanol and then dried in vacuo. The yield of this red dye was 50 grams (75%), m.p. >340° C.; vis (DMF), $\lambda_{max}$ 540 nm ($\epsilon$12,000); Anal. Calcd. for $C_{38}H_{24}O_4S_4$: C, 67.83; H, 3.59; O, 9.51; S, 19.06. Found: C, 67.51; H, 3.89; O, 9.35; S, 19.32.

EXAMPLE III

1,8-Bis[2-(p-hydroxyphenyl)ethylamino]anthraquinone (IV)

A mixture of 27.7 grams (0.1 mole) of 1,8-dichloroanthraquinone, 30 grams (0.22 mole) of p-(2-aminoethyl)-phenol in 200 milliliters of o-dichlorobenzene was heated to 160° C. for 18 hours. The mixture was cooled to room temperature, and the product was collected by filtration. It was recrystallized from isopropanol to yield 29 grams (62%) of 1,8-bis[2-(p-hydroxyphenyl)ethylamino]anthraquinone as a red powder, m.p. 181°–182° C., vis (DMF), $\lambda_{max}$ 520 nm ($\epsilon$12,000); ms 478 (M+); Calcd. for $C_{30}H_{26}N_2O_4$: C, 75.29; H, 5.48; N, 5.86; O, 13.38; Found: C, 74.94; H, 5.30; N, 5.63; O, 13.17.

EXAMPLE IV

1,4-Bis(p-hydroxyphenylamino)anthraquinone (VI)

A well-stirred mixture of 19.2 grams (0.08 mole) of quinizarine, 5.2 grams (0.02 mole) of leucoquinizarine, 30 grams (0.28 mole) of p-aminophenol, 1 gram of boric acid and 150 milliliters of ethanol were heated under reflux for 72 hours. The resulting reaction mixture was then cooled to room temperature and filtered. The above product VI was washed with ethanol and recrystallized from acetic acid. The yield of this blue dye was 30 grams (71%), m.p., 340°–342° C.; ms 422 (M+); vis (DMF), $\lambda_{max}$ 639 nm ($\epsilon$15,000); Anal. Calcd. for $C_{26}H_{18}N_2O_4$: C, 73.92; H, 4.29; N, 6.63; O, 15.15; Found: C, 73.50; H, 4.60; N, 6.45; O, 15.25.

EXAMPLE V

1,4-Bis[2-(p-hydroxyphenyl)ethylamino]anthraquinone (VII)

A mixture of 21 grams (0.09 mole) of leucoquinizarine, 30 grams (0.22 mole) of p-(2-aminoethyl)phenol in 150 milliliters of pyridine was refluxed for 12 hours. The mixture was cooled to room temperature and poured into 2 liters of water. Thereafter, the product was filtered, washed with water, and recrystillized from acetic acid to yield 26 grams, (60%) of 1,4-bis[2-(p-hydroxyphenyl)ethylamino]anthraquinone as a blue powder, m.p. 240°–242° C.; vis (DMF), $\lambda_{max}$ 644 nm ($\epsilon$16,600); 598 nm ($\epsilon$14,100); ms 478 (M+); Calcd. for $C_{30}H_{26}N_2O_4$: C, 75.29; H, 5.48; N, 5.86; O, 13.38; Found: C, 75.46; H, 5.32; N, 5.69; O, 13.26.

EXAMPLE VI

Yellow Polycarbonate (X)

A mixture of 32.2 grams (0.15 mole) of 2,2-bis(p-hydroxyphenyl)propane and 4.8 grams (0.0105 mole) of 1,5-bis(p-hydroxyphenylthio)anthraquinone was dissolved in 400 milliliters of methylene chloride in the presence of 38 milliliters of pyridine. The resulting solution was cooled in an ice-bath to 5°–10° C. Thereafter, there was added 41 grams (0.177 mole) of diethyleneglycol bischloroformate at a rate sufficient to maintain the reaction temperature at from 10°–15° C. The addition was carried out over a period of 30 minutes. Subsequently, the mixture was stirred at room temperature for 2 hours, and then 600 milliliters of methylene chloride was added thereto. The resulting solution was washed twice with water, and once with brine. After drying over anhydrous magnesium sulfate, the solution was concentrated to 250 milliliters and added dropwise to 5 liters of hexane with vigorous agitation. The precipitated polycarbonate product was filtered, washed with hexane and dried in vacuo. The yield of polycarbonate X(x=0.065, y=0.935) was 99%; $T_g$, 56° C. IR (neat) $cm^{-1}$ 2980(w), 1775(s), 1515(m), 1270(s), 1220(s), 1090(m), 1020(m).

EXAMPLE VII

Red Polyester (XI)

A solution of 11.4 grams (0.05 mole) of 2,2-bis(p-hydroxyphenyl)propane, 1.05 grams (0.0025 mole) of 1,5-bis(p-hydroxyphenylthio)-4,8-bisphenylthioanthraquinone, and 9.4 grams of pyridine in 125 milliliters of methylene chloride was cooled with an ice bath to 15° C. A solution of 8.87 grams (0.0525 mole) of glutaryl chloride in 10 milliliters of methylene chloride was added dropwise over a period of 20 minutes. Subsequently, the reaction mixture was stirred at room temperature for another 5 hours before being diluted with 100 milliliters of methylene chloride. The resulting solution was washed twice with water and once with brine. After drying over anhydrous magnesium sulfate, the solution was concentrated to 75 milliliters, and added dropwise to 2 liters of stirring methanol. The precipitate was isolated by filtration, and washed with methanol. There resulted the red polyester XI (x=0.048, y=0.952) in an 85% yield; $T_g$, 78° C. IR (neat) $cm^{-1}$:

2980(w), 1760(s), 1515(m), 1270(s), 1220(s), 1090(m), 1020(m).

EXAMPLE VIII

Blue Polyester (XIV)

A blue polyester resin represented by structure XIV with $x=0.048$ and $y=0.952$ was synthesized in accordance with the procedure of Example VII with the execption that 0.0025 mole of 1,4-bis(p-hydroxyphenylamino)anthraquinone was used as the functionalized dye. The yield of polyester XIV was 95%, $T_g$, 80° C. IR (neat) $cm^{-1}$ 2980(w), 1760(s), 1515(m), 1270(s), 1220(s), 1090(m), 1020(m).

EXAMPLE IX

Green Polycarbonate (XV)

A green polycarbonate resin represented by structure XV with $x=0.046$, $y=0.926$ and $z=0.028$ was synthesized in accordance with the procedure of Example VI with the exception that 0.0075 mole of 1,4-bis(p-hydroxyphenylamino)anthraquinone and 0.0045 mole of 1,5-bis(p-hydroxyphenylthio)anthraquinone were used in place of 0.0105 mole of 1,5-bis(p-hydroxyphenylthio)anthraquinone. The yield of green polycarbonate XV was 95%, $T_g$, 66° C. IR (neat) $cm^{-1}$ 2980(w), 1775(s), 1515(m), 1270(s), 1220(s), 1090(m), 1020(m).

EXAMPLE X

Red Polycarbonate (XIII)

A red polycarbonate resin represented by structure XII with $x=0.091$ and $y=0.909$ was prepared in accordance with the procedure of Example VI except that 0.015 mole of 1,5-bis(p-hydroxyphenylthio)-4,8-bis(phenylthio)anthraquinone was used in place of 1,5-bis(p-hydroxyphenylthio)anthraquinone. The yield of polycarbonate XII was 91%, $T_g$, 63° C. IR (neat) $cm^{-1}$, 2980(w), 1775(s), 1515(m), 1270(s), 1220(s), 1090(m), 1020(m).

EXAMPLE XI

Blue Polycarbonate (XVII)

A blue polycarbonate resin represented by structure XVII with $x=0.091$ and $y=0.909$ was synthesized in accordance with the procedure of Example VI using 0.015 mole of 1,4-bis[2-(p-hydroxyphenyl)ethylamino]anthraquinone instead of 1,5-bis(p-hydroxyphenylthio)anthraquinone. The yield of polycarbonate XVII was 91%; Tg, 67° C. IR (neat) $cm^{-1}$, 2980(w), 1775(s), 1515(m), 1270(s), 1220(s), 1090(m), 1020(m).

EXAMPLE XII

Red Polycarbonate (XII)

A red polycarbonate resin represented by structure XII with $x=0.091$ and $y=0.909$ was synthesized in accordance with the procedure of Example XI using 1,8-bis[2-(p-hydroxyphenyl)ethylamino]anthraquinone. IR (neat) $cm^{-1}$ 2980(w), 1775(s), 1515(m), 1270(s), 1220(s), 1090(m), 1020(m).

EXAMPLE XIII

Red Polyester (XVI)

A red polyester of structure XVI with $x=0.048$ and $y=0.952$ was synthesized in accordance with the procedure of Example VIII using 1,4-bis(p-hydroxyphenylthio)-anthraquinone and adipoyl chloride instead of 1,4-bis(p-hydroxyphenylamino)-anthraquinone and glutaryl chloride. The yield of polyester XVI was 93%; $T_g$, 74° C. IR (neat) $cm^{-1}$ 2980(w), 1760(s), 1515(m), 1270(s), 1220(s), 1090(m), 1020(m).

EXAMPLE XIV

Red Polyesters (XVIII)

A series of red polyesters with a 7 mole percent loading of the red chromophore as represented by structure XVIII [$B+M=0.07$, and $A+N=0.93$] were synthesized in accordance with the procedure of Example VII using a mixture of 2 acyl chlorides, namely, glutaryl chloride and sebacoyl chloride instead of just glutaryl chloride. The dependence of Tg of the resultant polyester on the proportions of the two acyl chlorides used [i.e $(A+B)$ and $(M+N)$] and $(M+N)$] is depicted in FIG. 1. It is evident from the Figure that colored polyesters XVIII of desirable Tg for fusing purposes can be synthesized. These polyesters displayed infrared spectral properties as follows (neat): 2980(w), 1760(s), 1515(m), 1270(s), 1220(s), 1090(m), 1020(m)$cm^{-1}$.

With respect to the functionalized bisphenolic dyes, they can be prepared by a number of different processes. In one process, for example, there are selected chlorinated anthraquinone precursors such as 1,5-dichloroanthraquinone; 1,8-dichloroanthraquinone; or 1,4-dichloroanthraquinone. This precursor is first dissolved in a suitable organic solvent such as dimethylformamide in the presence of a base such as potassium carbonate, followed by the addition of a hydroxyarenethiol. The molar ratio of the thiol to the chlorinated anthraquinone is 2.0 to 2.25. Subsequently, the solution is mechanically stirred and heated to reflux for from 1 to 24 hours. The reaction mixture is then cooled and poured into water and filtered, and the solid product washed with water and dried. The functionalized dye obtained is purified by recrystallization from an appropriate solvent such as acetic acid.

A second process involves reacting a chlorinated anthraquinone with an alkylaminophenol in a suitable organic solvent such as o-dichlorobenzene, with the molar ratio of the aminophenol to chlorinated anthraquinone being 2.0 to 2.25. The mixture is mechanically stirred and heated to 160° C. for from 8 to 24 hours. Subsequently, the reaction mixture is cooled to room temperature and the product collected by filtration. The functionalized dye obtained is purified by recrystallization from an appropriate solvent such as isopropanol.

A third process involves treatment of a solution of chlorinated nitroanthraquinone such as 1,5-dichloro-4,8-dinitroanthraquinone in a suitable organic solvent such as dimethylformamide with an aryl thiol in the presence of a base such as potassium carbonate at room temperature, with the molar ratio of thiol to anthraquinone being 2.0. After about 3 hours at room temperature, a hydroxyarenethiol is added and the reaction mixture is subsequently heated to reflux for from 1 to 4 hours. The molar ratio of the thiol to anthraquinone is 2.0 to 2.25. Subsequently, the reaction mixture is cooled to room temperature and poured into water. The product is filtered, washed with water and methanol, and dried to yield the desired bisphenolic dye.

Another process involves reacting a hydroxy anthraquinone such as quinizarine and leucoquinizarine with an alkylaminophenol in a suitable solvent such as pyridine. The molar ratio of the amiinophenol to hydroxy anthraquinone is 2.0 to 2.25. The reaction mixture is mechanically stirred and heated to reflux for from 1 to 24 hours. Subsequently, the mixture is cooled and poured into water, the resulting solid product is filtered, washed with water and dried; followed by recrystallization from an appropriate solvent such as acetic acid to yield the pure bisphenolic dye.

Other modifications of the present invention may occur to those skilled in the art based upon a reading of the present disclosure and these modifications are intended to be included within the scope of the present invention. Thus, colored xerographic images can be developed in accordance with the process described in U.S. Pat. No. 4,311,932, the disclosure of which is totally incorporated herein by reference.

What is claimed is:

1. A toner composition comprised of resin particles with covalently bonded polymeric dye chromophores, which resins are of the following formula:

$$[O-A-\boxed{DYE}-A-O-B]_x-[-D-B-]_y$$

wherein A is selected from the group consisting of alkylene and arylene; B is selected from the group consisting of $$-\overset{O}{\underset{\|}{C}}-\quad -\overset{O}{\underset{\|}{C}}-R-\overset{O}{\underset{\|}{C}}-\quad -\overset{O}{\underset{\|}{CO}}-R-\overset{O}{\underset{\|}{OC}}-$$

wherein R is an alkylene group, an arylene or polyether segment; D is selected from the group consisting of dioxyalkane and dioxyarene; x is a fraction number of 0.01 to 0.50; and y is a fraction number of 0.50 to 0.99, with x+y being equal to 1.

2. A toner composition in accordance with claim 1 wherein the alkylene group contains from about 1 to about 20 carbon atoms.

3. A toner composition in accordance with claim 1 wherein the alkylene is methylene or ethylene.

4. A toner composition in accordance with claim 1 wherein the dioxyarene group contains from about 6 to about 24 carbon atoms.

5. A toner composition in accordance with claim 1 wherein R is an alkylene of from 1 to about 6 carbon atoms.

6. A toner composition in accordance with claim 1 wherein R is methylene.

7. A toner composition in accordance with claim 1 wherein the arylene is phenylene.

8. A toner composition in accordance with claim 1 wherein the arylene is selected from the group consisting of paraphenylene, metaphenylene, orthophenylene, para-benzophenylene, and tolylene.

9. A toner composition in accordance with claim 1 wherein the B substituent is $-CO_2(CH_2CH_2O)CO-$.

10. A toner composition in accordance with claim 1 wherein the B substituent is $CO(CH_2)_3CO$.

11. A toner composition in accordance with claim 1 wherein the B substituent is $CO(CH_2)_4CO$.

12. A toner composition in accordance with claim 1 wherein the B substituent is $CO(CH_2)_8CO$.

13. A toner composition in accordance with claim 1 wherein the B is dioxymethylene.

14. A toner composition in accordance with claim 1 wherein D is dioxybenzene.

15. A toner composition in accordance with claim 1 wherein the dye is selected from the group consisting of wherein X and Y are independently selected from $SC_6H_5$; $SCH_3$; $SC_2H_5$; and hydrogen.

16. A toner composition in accordance with claim 1 wherein the dye is selected from the group consisting of wherein V and W are independently selected from the group consisting of $NH(CH_2)_n-$; $NHC_6H_4-$; $NH(CH_2)_nC_6H_4-$; $NHC_6H_4(CH_2)_n-$, wherein n is a number of from zero (0) to about 20.

17. A toner composition in accordance with claim 1 wherein the resin is

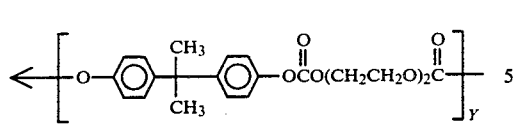

wherein the sum of X+Y is equal to 1.

18. A toner composition in accordance with claim 1 wherein the resin is

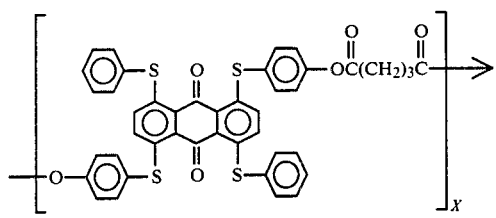

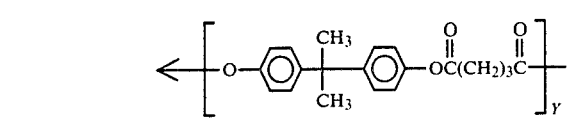

wherein the sum of X+Y is equal to 1.

19. A toner composition in accordance with claim 1 wherein the resin is

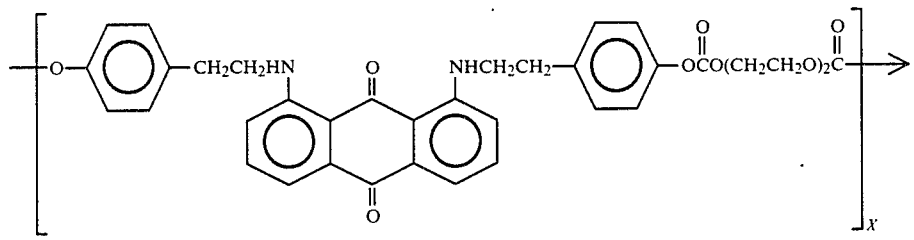

wherein the sum of X+Y is equal to 1.

20. A toner composition in accordance with claim 1 wherein the resin is

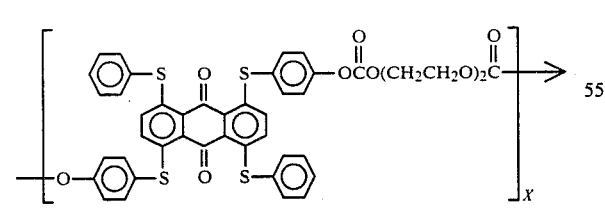

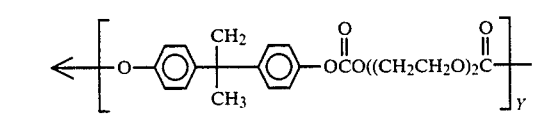

wherein the sum of X+Y is equal to 1.

21. A toner composition in accordance with claim 1 wherein the resin is

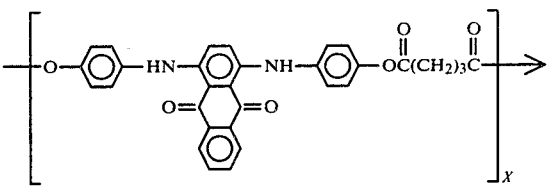

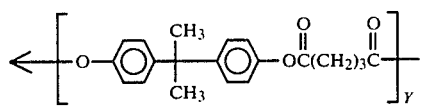

wherein the sum of X+Y is equal to 1.

22. A toner composition in accordance with claim 1 wherein the resin is

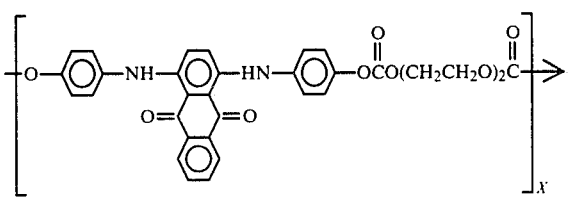

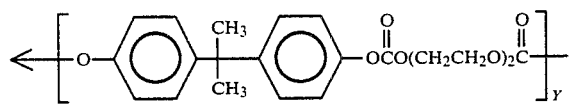

wherein the sum of X+Y+Z is equal to 1.

23. A toner composition in accordance with claim 1 wherein the resin is

25. A toner composition in accordance with claim 1 wherein the resin is

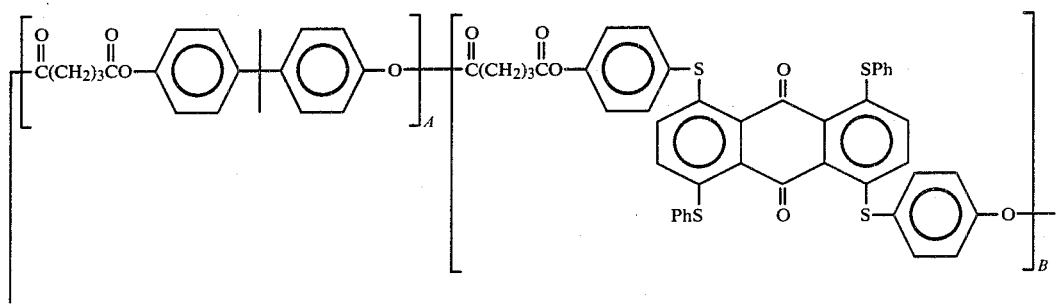

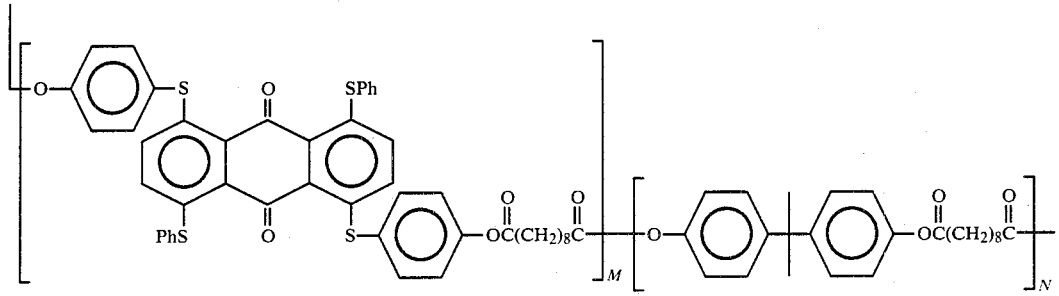

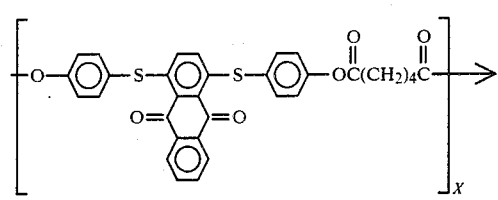

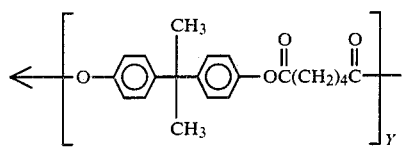

wherein the sum of X+Y is equal to 1.

24. A toner composition in accordance with claim 1 wherein the resin is

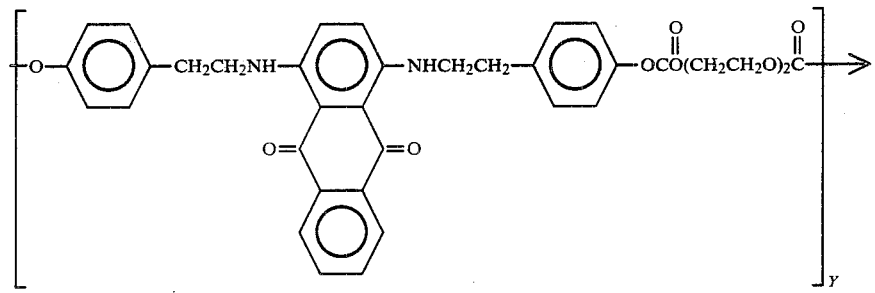

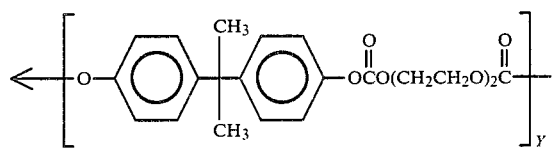

wherein the sum of X+Y is equal to 1.

wherein B+M equals 0.07, and A+N equals 0.93.

26. A developer composition comprised of the toner composition of claims 1 and carrier particles.

27. A developer composition in accordance with claim 26 wherein the dioxyalkane group of the polymeric chromophore contains from about 1 to about 20 atoms.

28. A developer composition in accordance with claim 26 wherein the dioxyalkane group is dioxymethane or dioxyethane.

29. A developer composition in accordance with claim 26 wherein the dioxyarene group of the polymeric chromophore contains from about 6 to about 24 carbon atoms.

30. A developer composition in accordance with claim 26 wherein the dioxyarene group is dioxybenzene.

31. A developer composition in accordance with claim 26 wherein R is an alkylene of from 1 to about 6 carbon atoms.

32. A developer composition in accordance with claim 26 wherein R is a methylene.

33. A developer composition in accordance with claim 26 wherein the arylene is phenylene.

34. A developer composition in accordance with claim 26 wherein arylene is selected from the group consisting of paraphenylene, metaphenylene, orthophenylene, para-benzophenylene, and octamethylene.

35. A developer composition in accordance with claim 26 wherein the B substituent for the resin is COO(CH$_2$CH$_2$O)$_2$CO.

36. A developer composition in accordance with claim 26 wherein the B substituent for the resin is CO(CH$_2$)$_3$CO.

37. A developer composition in accordance with claim 26 wherein the B substituent for the resin is CO(CH$_2$)$_4$CO.

38. A developer composition in accordance with claim 26 wherein the B substituent for the resin is CO(CH$_2$)$_8$CO.

39. A developer composition in accordance with claim 26 wherein the D for the resin is dioxymethane.

40. A developer composition in accordance with claim 26 wherein the D for the resin is dioxybenzene.

41. A developer composition in accordance with claim 26 wherein the dye chromophore is selected from the group consisting of

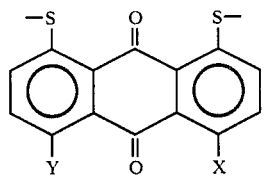

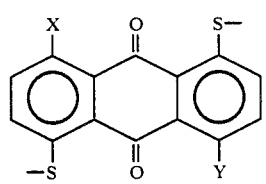

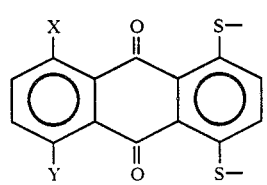

wherein X and Y are independently selected from SC$_6$H$_5$; SCH$_3$; SC$_2$H$_5$; and hydrogen.

42. A developer composition in accordance with claim 26 wherein the dye chromophore is selected from the group consisting of

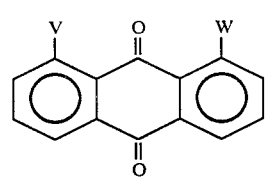

-continued

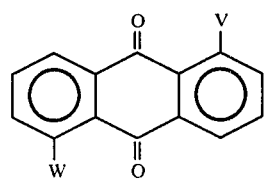

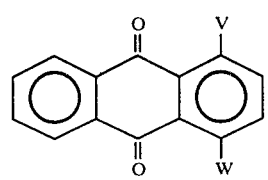

wherein V and W are independently selected from the group consisting of NH(CH$_2$)$_n$—; NHC$_6$H$_4$—; NH(CH$_2$)$_n$C$_6$H$_4$—; and NHC$_6$H$_4$(CH$_2$)$_n$—, wherein n is a number of from zero (0) to about 20.

43. A developer composition in accordance with claim 26 wherein the resin is

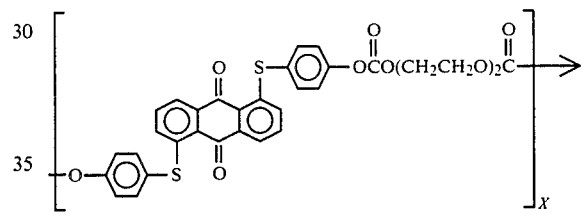

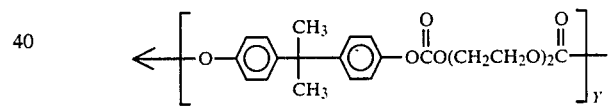

wherein X+Y equals 1.

44. A developer composition in accordance with claim 26 wherein the resin is

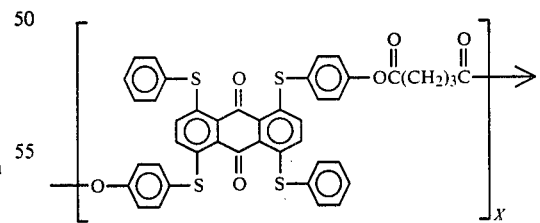

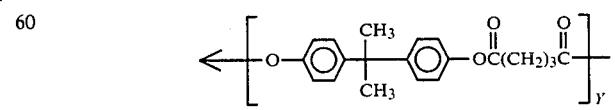

wherein X+Y equals 1.

45. A toner composition in accordance with claim 26 wherein the resin is

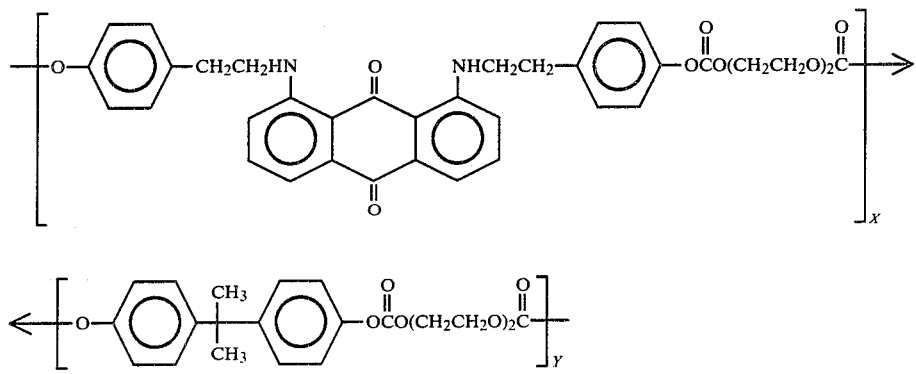

wherein X+Y equals 1.

46. A toner composition in accordance with claim 26 wherein the resin is

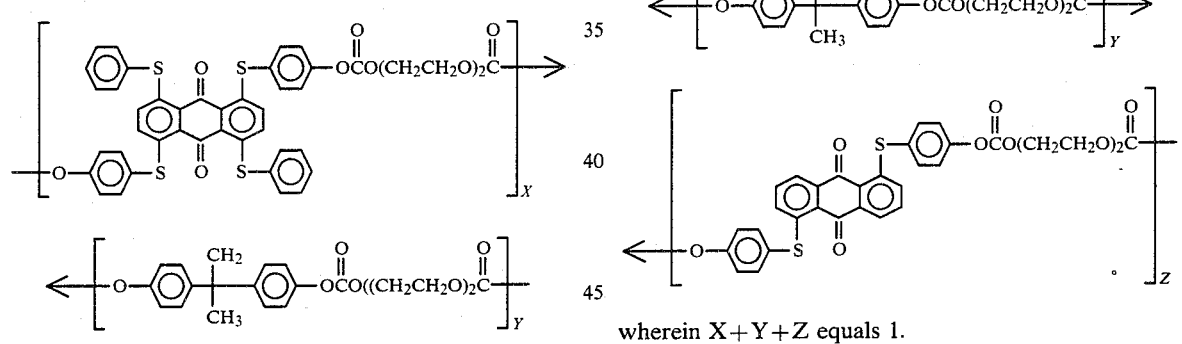

wherein X+Y equals 1.

47. A toner composition in accordance with claim 26 wherein the resin is

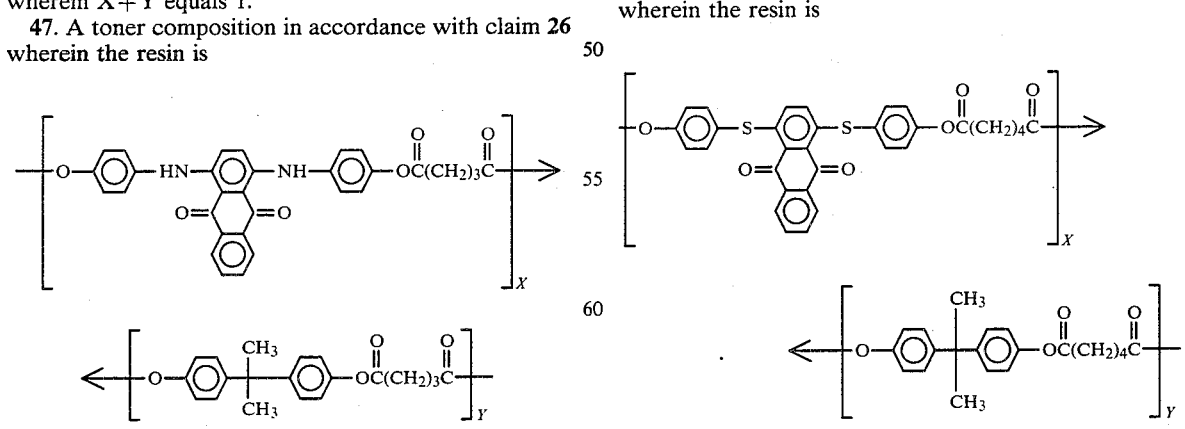

wherein X+Y equals 1.

48. A toner composition in accordance with claim 26 wherein the resin is

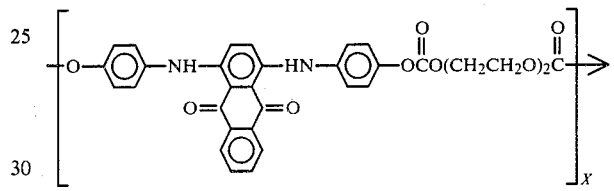

wherein X+Y+Z equals 1.

49. A toner composition in accordance with claim 26 wherein the resin is wherein X+Y equals 1.

50. A toner composition in accordance with claim 26 wherein the resin is

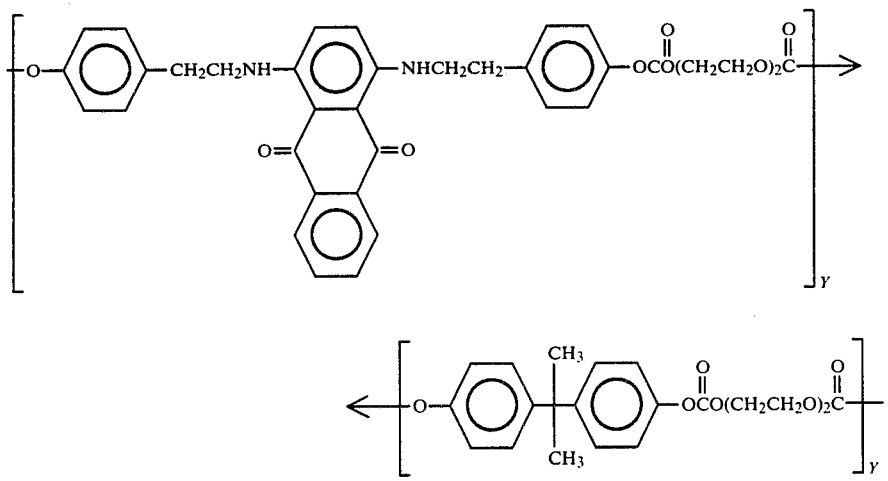

wherein X+Y equals 1.

51. A toner composition in accordance with claim 26 wherein the resin is

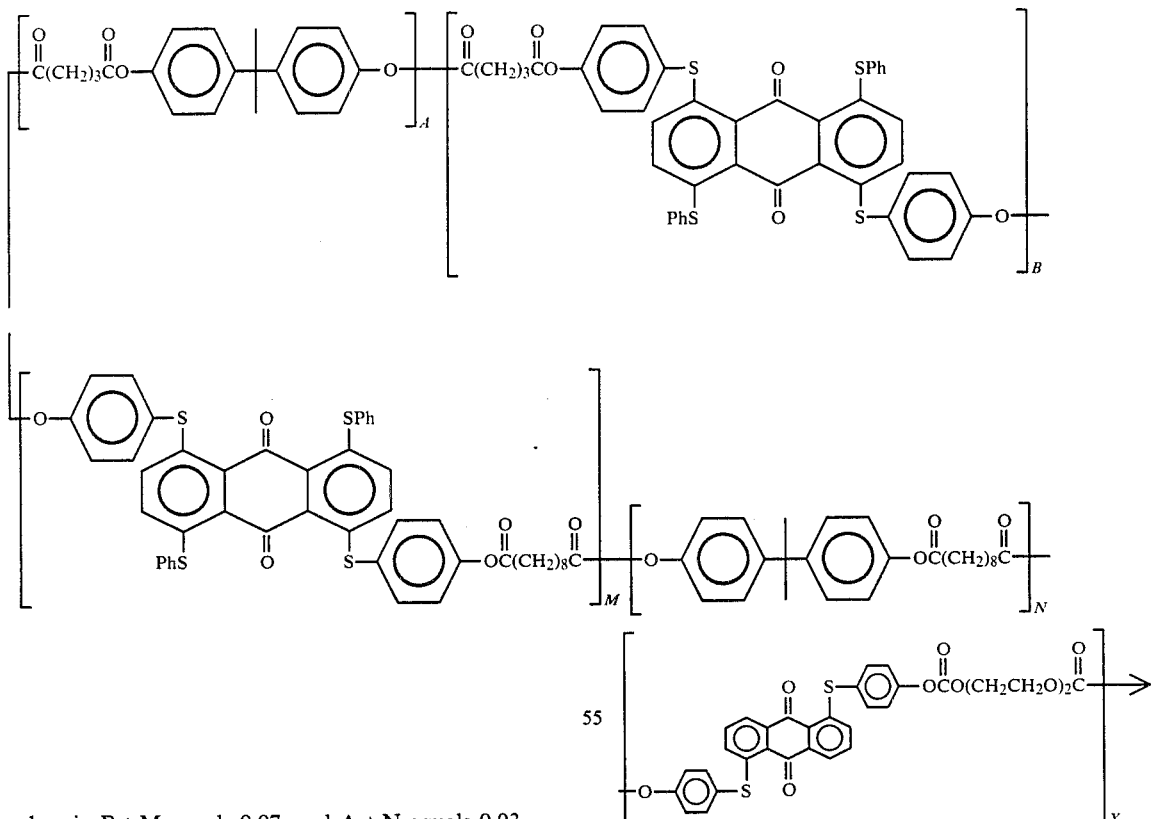

wherein B+M equals 0.07, and A+N equals 0.93.

52. A method of imaging which comprises generating an electrostatic latent image on a photoresponsive imaging member, developing the image formed with the toner composition of claim 1, and subsequently transferring the image to a permanent substrate.

53. A method of imaging in accordance with claim 52 wherein the image is fixed thereto.

54. A method of imaging in accordance with claim 52 wherein the resin is of the formula

55. A method of imaging in accordance with claim 52 wherein the resin is of the formula

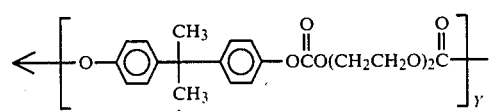

wherein X+Y equals 1.

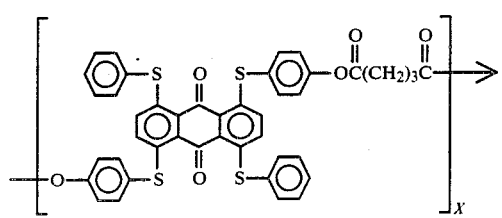

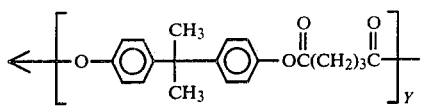

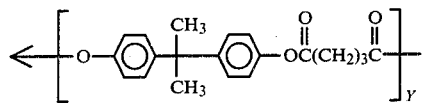

wherein X+Y equals 1.

59. A method of imaging in accordance with claim 52 wherein the resin is of the formula

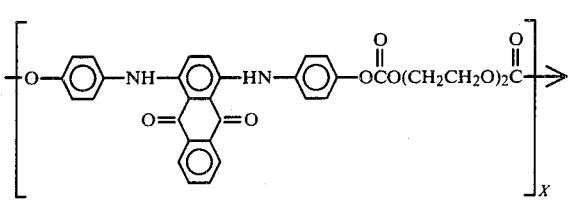

wherein X+Y equals 1.

56. A method of imaging in accordance with claim 52 wherein the resin is of the formula

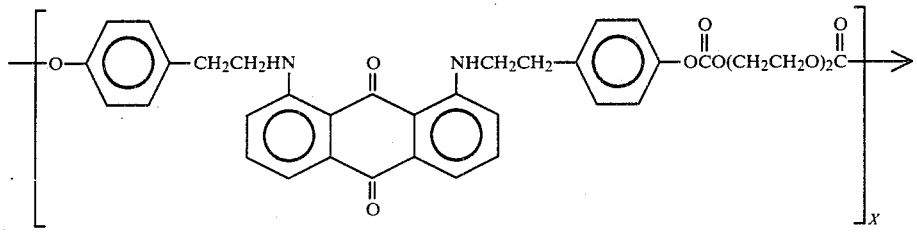

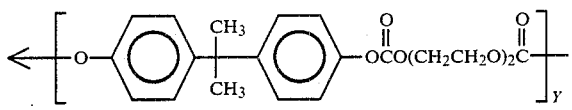

wherein X+Y equals 1.

57. A method of imaging in accordance with claim 52 wherein the resin is of the formula

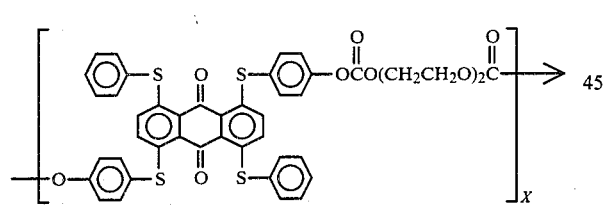

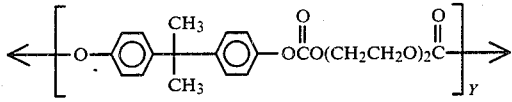

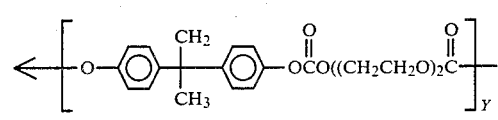

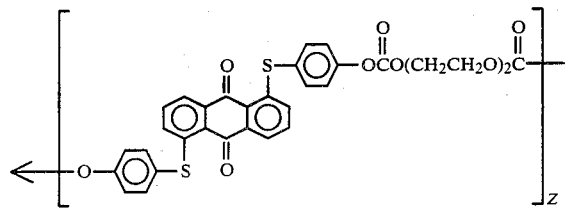

wherein X+Y equals 1.

58. A method of imaging in accordance with claim 52 wherein the resin is of the formula wherein X+Y+Z equals 1.

60. A method of imaging in accordance with claim 52 wherein the resin is of the formula

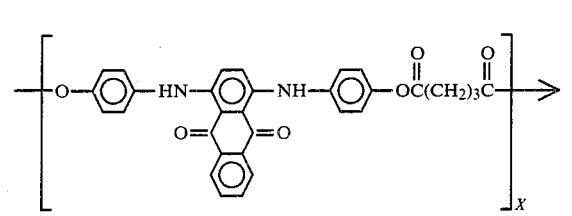

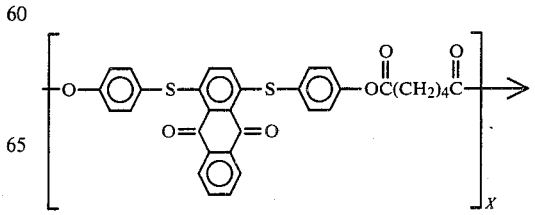

61. A method of imaging in accordance with claim 52 wherein the resin is of the formula
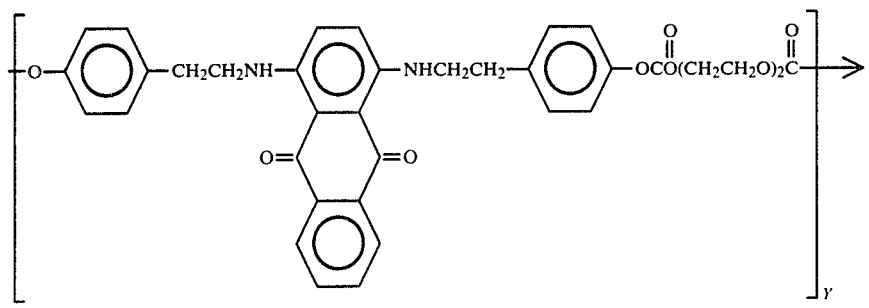
wherein X+Y equals 1.
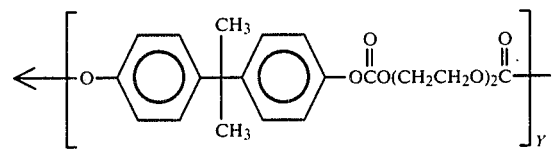
wherein X+Y equals 1.
62. A method of imaging in accordance with claim 52 wherein the resin is of the formula
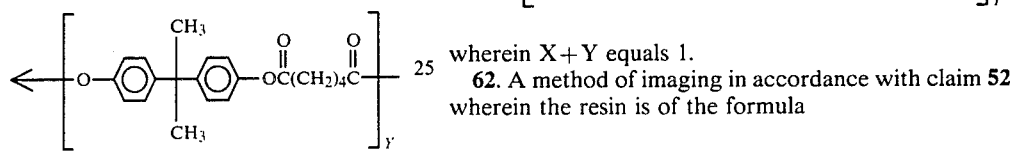
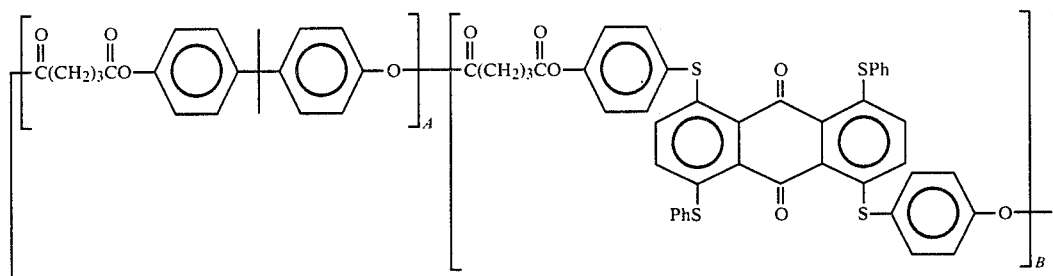
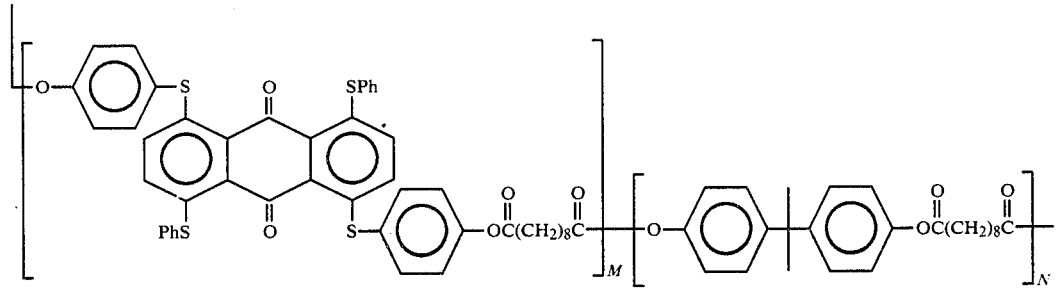
wherein B+M equals 0.07, and A+N equals 0.93.

UNITED STATES PATENT AND TRADEMARK OFFICE
CERTIFICATE OF CORRECTION

PATENT NO.: 4,645,727
DATED: February 24, 1987
INVENTOR(S): Beng S. Ong and Walter Mychajlowskij It is certified that an error appears in the above-identified patent and that said Letters Patent is hereby corrected as shown below:

Please delete the two sentences in column 18, lines 13 to 18, beginning with the phrase "The dependence . . .", and ending with the phrase ". . . can be synthesized".

Signed and Sealed this

Eleventh Day of August, 1987

*Attest:*

DONALD J. QUIGG

*Attesting Officer*   *Commissioner of Patents and Trademarks*